(12) United States Patent
Yang et al.

(10) Patent No.: US 8,918,053 B2
(45) Date of Patent: Dec. 23, 2014

(54) INTERFERENCE ELIMINATION METHOD AND APPARATUS FOR MULTI-ANTENNA SYSTEM

(75) Inventors: Yi Yang, Shanghai (CN); Shuojun Yu, Shanghai (CN); Gengshi Wu, Shanghai (CN); Nian Peng, Shanghai (CN); Feng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 13/428,576

(22) Filed: Mar. 23, 2012

(65) Prior Publication Data

US 2012/0244897 A1    Sep. 27, 2012

(30) Foreign Application Priority Data

Mar. 25, 2011    (CN) .......................... 2011 1 0073799

(51) Int. Cl.
 *H04B 1/00*   (2006.01)
 *H04L 25/02*  (2006.01)
 *H04L 25/03*  (2006.01)
(52) U.S. Cl.
 CPC ........ *H04L 25/0206* (2013.01); *H04L 25/0242* (2013.01); *H04L 25/03891* (2013.01)
 USPC ...... 455/63.1; 455/67.13; 455/65; 455/114.2; 455/501
(58) Field of Classification Search
 USPC .......................... 455/63.1, 67.13, 114.2, 501
 See application file for complete search history.

(56) References Cited

FOREIGN PATENT DOCUMENTS

CN          1604512 A      4/2005
WO    WO 2008/011745 A1   1/2008

OTHER PUBLICATIONS

Search Report issued in corresponding Chinese Patent Application No. 2011100737993, dated Feb. 21, 2013.

*Primary Examiner* — Raymond Dean
(74) *Attorney, Agent, or Firm* — Brinks Gilson & Lione

(57) ABSTRACT

Embodiments of the present invention disclose an interference elimination method and apparatus for a multi-antenna system. The method includes: generating an equalization coefficient according to a baseband signal received on a receiving antenna, a channel estimation matrix, and an obtained cross-correlation matrix of transmitted signals of a downlink channel on multiple transmit antennas; and performing interference elimination processing on the baseband signal according to the equalization coefficient.

18 Claims, 5 Drawing Sheets

INTERFERENCE ELIMINATION METHOD AND APPARATUS FOR MULTI-ANTENNA SYSTEM

CROSS-REFERENCE TO RELATED APPLICATIONS

This application claims priority to Chinese Patent Application No. 201110073799.3, filed on Mar. 25, 2011, which is hereby incorporated by reference in their entireties.

FIELD OF THE INVENTION

Embodiments of the present invention relate to communications technologies, and in particular, to an interference elimination method and apparatus for a multi-antenna system.

BACKGROUND OF THE INVENTION

Wideband code division multiple access (Wideband Code Division Multiple Access; abbreviated as WCDMA hereinafter) as a widely used 3G technology in the world at present provides voice and data services for a user. Multiple input multiple output (Multiple Input Multiple Output; abbreviated as MIMO hereinafter) technology can provide higher data throughput by using multiple paths without occupying extra radio frequencies. Therefore, the application of the MIMO technology in a WCDMA system can improve the system capacity. High speed downlink packet access (High Speed Downlink Packet Access; abbreviated as HSDPA hereinafter) is a critical technology for improving data throughput introduced in release R5 of WCDMA standard, and in WCDMA standard, a closed-loop transmit mechanism of a double-transmit antennas array (Double-Transmit Antennas Array; abbreviated as D-TxAA hereinafter) and a closed-loop transmit diversity mode of a single-transmit antenna array (TxAA) are used to implement MIMO. In the downlink link of the WCDMA system, signals of a user are affected by interference including inter-cell interference and intra-cell interference, so interference elimination needs to be considered in demodulation.

In the prior art, a minimum mean squared error (Minimum Mean Squared Error; abbreviated as MMSE hereinafter) equalizer is generally used to eliminate the interference, that is, a transmitted signal on one of two transmit antennas is modeled as interference, and the interference of the transmit antennas is eliminated by an equalizer.

In the implementation of the present invention, the inventor finds that the prior art has the following problems. The MMSE equalizer in the prior art does not consider correlation between transmitted signals on two transmit antennas, causing undesirable equalization effect and low performance of a receiver.

SUMMARY OF THE INVENTION

Embodiments of the present invention provide an interference elimination method and apparatus for a multi-antenna system, so as to eliminate interference generated due to correlation between transmitted signals of a downlink channel on multiple transmit antennas, improve the equalization effect, and improve the performance of a receiver.

In order to achieve the foregoing objectives, an embodiment of the present invention provides an interference elimination method for a multi-antenna system, which includes:

generating an equalization coefficient according to a baseband signal received on a receiving antenna, a channel estimation matrix, and an obtained cross-correlation matrix of transmitted signals of a downlink channel on multiple transmit antennas; and performing interference elimination processing on the baseband signal according to the equalization coefficient.

An embodiment of the present invention provides an interference elimination apparatus for a multi-antenna system, which includes:

a coefficient generation module, configured to generate an equalization coefficient according to a baseband signal received on a receiving antenna, a channel estimation matrix, and an obtained cross-correlation matrix of transmitted signals of a downlink channel on multiple transmit antennas; and an interference elimination module, configured to perform interference elimination processing on the baseband signal according to the equalization coefficient.

According to an interference elimination method and apparatus for a multi-antenna system provided by the embodiments of the present invention, in calculation of the equalization coefficient of a equalizer, the correlation between the transmitted signals of the downlink channel on multiple transmit antennas is considered, the equalization coefficient is generated according to the baseband signal received on the receiving antenna, the channel estimation matrix, and the obtained cross-correlation matrix of the transmitted signals of the downlink channel on multiple transmit antennas, and the interference elimination processing is performed on the baseband signal according to the equalization coefficient. Therefore, in the embodiments, the interference generated due to the correlation between the transmitted signals of the downlink channel on multiple transmit antennas is eliminated, the equalization effect is improved, and the performance of a receiver is improved.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following description merely show some of the embodiments of the present invention, and persons of ordinary skill in the art can obtain other drawings according to the accompanying drawings without creative efforts.

DETAILED DESCRIPTION OF THE EMBODIMENTS

In order to make the objectives, technical solutions, and advantages of the embodiments of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
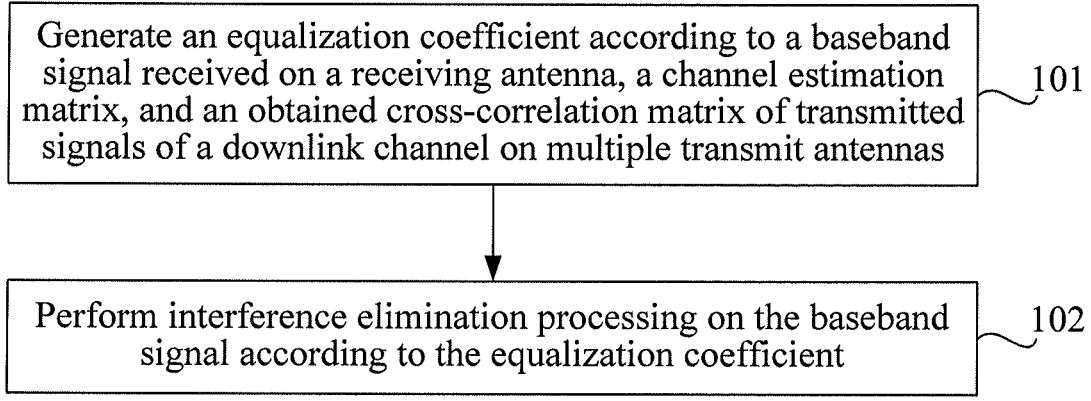
FIG. 1 is a flow chart of a first embodiment of an interference elimination method for a multi-antenna system according to the present invention.

FIG. 1 is a flow chart of a first embodiment of an interference elimination method for a multi-antenna system according to the present invention. As shown in FIG. 1, the embodiment provides an interference elimination method for a multi-antenna system, which may specifically includes the following steps:

Step 101: Generate an equalization coefficient according to a baseband signal received on a receiving antenna, a channel estimation matrix, and an obtained cross-correlation matrix of transmitted signals of a downlink channel on multiple transmit antennas.

With a TxAA transmit mechanism, user data on a high speed downlink physical channel (High Speed Downlink Physical Channel; abbreviated as HS-DPSCH hereinafter) is spectrum spread, scrambled, multiplied by an antenna weight vector (antenna weight vector), and then sent on multiple transmit antenna. Therefore, correlation exists between transmitted signals on multiple transmit antennas. In this embodiment, when the equalization coefficient of a equalizer is calculated, the correlation between the transmitted signals of the downlink channel on multiple transmit antennas is considered, that is, the equalization coefficient is generated through calculation according to the baseband signal received on the receiving antenna, the channel estimation matrix, and the obtained cross-correlation matrix of the transmitted signals of the downlink channel on multiple transmit antennas. The downlink channel may include an HS-DPSCH channel of a current user, may further include an HS-DPSCH channel of a non-current user in a cell where the current user resides, that is, the HS-DPSCH channel of another HSDPA user in the current cell, and may further include other channels other than the HS-DPSCH channel. The other channels may be a primary common pilot channel (Primary Common Pilot Channel; abbreviated as P-CPICH hereinafter) and/or a dedicated physical channel (Dedicated Physical Channel; abbreviated as DPCH hereinafter) using a transmit diversity mode or the like.

Step 102: Perform interference elimination processing on the baseband signal according to the equalization coefficient.

After the cross-correlation between the transmitted signals of various physical channels on multiple transmit antennas is considered and the equalization coefficient is obtained in the foregoing steps, equalization processing is performed on the baseband signal, which is received by a receiver by the equalizer formed according to the equalization coefficient, so as to eliminate the interference in the baseband signal generated due to the correlation between signals.

According to an interference elimination method for a multi-antenna system provided by the embodiment, in calculation of the equalization coefficient of the equalizer, the correlation between the transmitted signals of the downlink channel on multiple transmit antennas is considered, the equalization coefficient is generated according to the baseband signal received on the receiving antenna, the channel estimation matrix, and the obtained cross-correlation matrix of the transmitted signals of the downlink channel on multiple transmit antennas, and the interference elimination processing is performed on the baseband signal according to the equalization coefficient. In the embodiment, the interference generated due to the correlation between the transmitted signals of the downlink channel on multiple transmit antennas is eliminated, the equalization effect is improved, and the performance of the receiver is improved.

Figure 2:
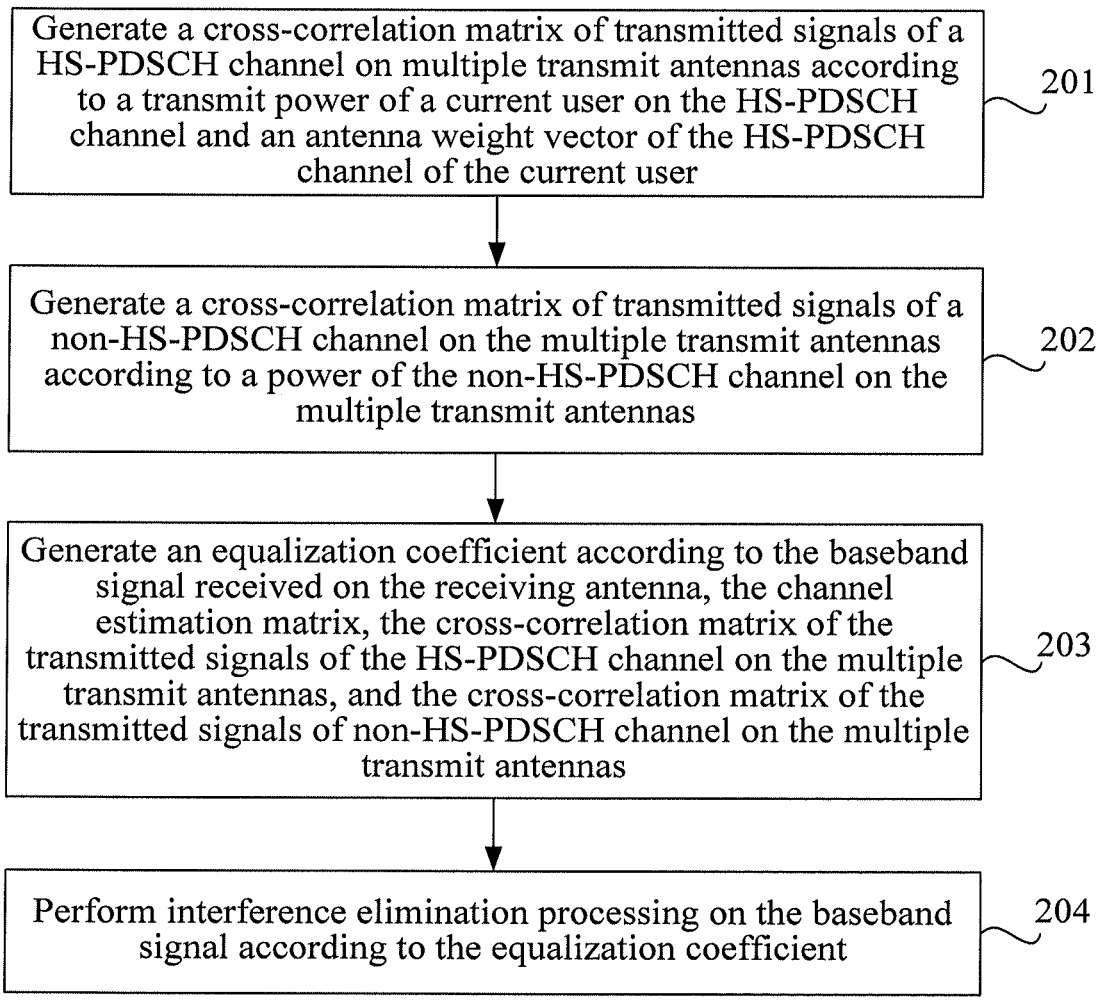
FIG. 2 is a flow chart of a second embodiment of an interference elimination method for a multi-antenna system according to the present invention.

FIG. 2 is a flow chart of a second embodiment of an interference elimination method for a multi-antenna system according to the present invention. As shown in FIG. 2, the embodiment provides an interference elimination method for a multi-antenna system. In this embodiment, cross-correlation of transmitted signals of an HS-PDSCH channel on multiple transmit antennas is mainly considered. The method provided in the embodiment may specifically include the following steps.

Step 201: Generate a cross-correlation matrix of transmitted signals of an HS-PDSCH channel on multiple transmit antennas according to transmit power of a current user on the HS-PDSCH channel and an antenna weight vector of the HS-PDSCH channel of the current user.

In this embodiment, as cross-correlation of the transmitted signals of the HS-PDSCH channel on multiple transmit antennas is considered, a cross-correlation matrix $R_{ss}$ of the transmitted signals of the HS-PDSCH channel on multiple transmit antennas is generated first according to the transmit power of the current user on the HS-PDSCH channel and the antenna weight vector of the HS-PDSCH channel of the current user, and is specifically obtained through calculation by using Formula (1) below:

$$R_{ss} = (\alpha_s^{(1)} w^{(1)} w^{(1)H}) \otimes I \quad (1)$$

where, $\otimes$ represents direct product, $\alpha_s^{(1)}$ is the transmit power of the current user on the HS-PDSCH channel, $$w^{(1)} = \begin{bmatrix} w_1^{(1)} \\ \ldots \\ w_n^{(1)} \end{bmatrix}$$

is the antenna weight vector of the current user on the HS-PDSCH channel, I is a unit matrix, in which the number of dimensions of the matrix I is equal to the number of columns of a channel estimation matrix H, and n is the number of the transmit antennas.

In the step, when the cross-correlation matrix is calculated, only the cross-correlation of the transmitted signals of the HS-PDSCH channel of the current user on the multiple transmit antennas is considered. Further, if in addition to the current user, other HSDPA users, which are collectively referred to as non-current users, exist in a cell where the current user resides, when the cross-correlation matrix $R_{ss}$ of the transmitted signals of the HS-PDSCH channel on the multiple transmit antennas is generated in the step, cross-correlation of transmitted signals of HS-PDSCH channels of the other HSDPA users in the cell on the multiple transmit antennas needs to be further considered. In this case, the cross-correlation matrix $R_{ss}$ of the transmitted signals of the HS-PDSCH channels on the multiple transmit antennas is generated through calculation by using Formula (2) below:

$$R_{ss} = \left( \alpha_s^{(1)} w^{(1)} w^{(1)H} + \sum_{p=2}^{U} \alpha_s^{(p)} w^{(p)} w^{(p)H} \right) \otimes I \quad (2)$$

where, $p \in (2, 3, \ldots, U)$, $U-1$ is the number of non-current users, $\alpha_s^{(p)}$ is transmit power of the non-current users, and $$w^{(p)} = \begin{bmatrix} w_1^{(p)} \\ \ldots \\ w_n^{(p)} \end{bmatrix}$$

is an antenna weight vector of the HS-PDSCH channels of the non-current users.

Step 202: Generate a cross-correlation matrix of transmitted signals of a non-HS-PDSCH channel on multiple transmit antennas according to power of the non-HS-PDSCH channel on the multiple transmit antennas.

The step is specifically: generating, according to the power of the non-HS-PDSCH channel on the multiple transmit antennas, a cross-correlation matrix $R_{qq}$ of the transmitted signals of the non-HS-PDSCH channel on the multiple transmit antennas by using Formula (3) below:

$$R_{qq} = \begin{pmatrix} \alpha_{q1}^{(1)} & \ldots & 0 \\ 0 & \ldots & 0 \\ 0 & \ldots & \alpha_{qn}^{(1)} \end{pmatrix} \quad (3)$$

where, $R_{qq}$ is a diagonal matrix, $\alpha_{qi}^{(1)}$ ($i=1, 2, \ldots, n$) is power of the non-HS-PDSCH channel on the multiple transmit antennas, and $$\sum_{q=1}^{n} \alpha_{qi}^{(1)} = E_c,$$

where $E_c$ is chip power; and the antenna weight vector is 0.

Step 203: Generate an equalization coefficient according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas.

In this embodiment, it is assumed that a baseband signal received on a certain receiving antenna is r, which r expressed by Formula (4) below:

$$r = Hs + v, \; s = (s_1, \ldots, s_n)^T \quad (4)$$

In the formula, H is the channel estimation matrix of a channel that transmitted signals on transmit antennas pass through, $s_i$ ($i=1, \ldots, n$) is transmitted signals of user data on a transmit antenna i, v is a noise vector, and it is assumed herein that $E[|s_1|^2] = E[|s_2|^2] = \ldots = E[|s_n|^2] = E_c$, and $E_c$ is chip power. With a TxAA transmit mechanism, a receiver needs to detect user data (represented by $s^{(1)}$ in this embodiment) of the current user on the HS-PDSCH channel, the equalization coefficient is generated according to an MMSE rule, that is, $\arg_f \min E\|f^H r(k) - s^{(1)}(k+d)\|^2$ is met, in which f is the equalization coefficient, and d is the delay of an equalizer, and accordingly, an expression formula of the equalization coefficient f as shown by Formula (5) below is obtained:

$$f = \{HR_{ss}H^H + HR_{qq}H^H + R_{vv}\}^{-1} H e_d \quad (5)$$

where, H is the channel estimation matrix, $R_{vv}$ is a cross-correlation matrix of noise, and $e_d$ represents an element of a column d from the matrix. In Formula (5), the cross-correlation matrix $R_{ss}$ may be specifically a matrix generated through calculation by using Formula (1) or Formula (2); when other HSPDA users do not exist in the cell where the current user resides, the cross-correlation matrix generated through calculation by using Formula (1) is used, and $$\sum_{q=1}^{n} \alpha_{qi}^{(1)} = E_c;$$

and when other HSPDA users exist in the cell where the current user resides, the cross-correlation matrix generated through calculation by using Formula (2) is used, and $$\sum_{p=1}^{U} \alpha_s^{(p)} + \sum_{q=1}^{n} \alpha_{qi}^{(1)} = E_c.$$

Step 204: Perform interference elimination processing on the baseband signal according to the equalization coefficient.

After the equalization coefficient f is obtained in the foregoing step, the interference elimination processing is performed on the baseband signal r received by the receiver according to the equalization coefficient, which is specifically as shown by Formula (6) below:

$$r' = f^H r \quad (6)$$

Then, after the received baseband signal is processed by an MMSE equalizer, an estimated value r' of a transmitted signal is obtained, and the interference generated due to the cross-correlation of the transmitted signals of the HS-PDSCH channel on the multiple transmit antennas is eliminated.

According to an interference elimination method for a multi-antenna system provided by the embodiment, in calculation of the equalization coefficient of the equalizer, the correlation between the transmitted signals of the HS-PDSCH channel on multiple transmit antennas is considered, the equalization coefficient is generated according to the baseband signal received on the receiving antenna, the channel estimation matrix, and the cross-correlation matrix of the transmitted signals of the HS-PDSCH channel on multiple transmit antennas, and the interference elimination processing is performed on the baseband signal according to the equalization coefficient. In the embodiment, the interference generated due to the correlation between the transmitted signals of the HS-PDSCH channel on multiple transmit antennas is eliminated, the equalization effect is improved, and the performance of the receiver is improved.

Figure 3:
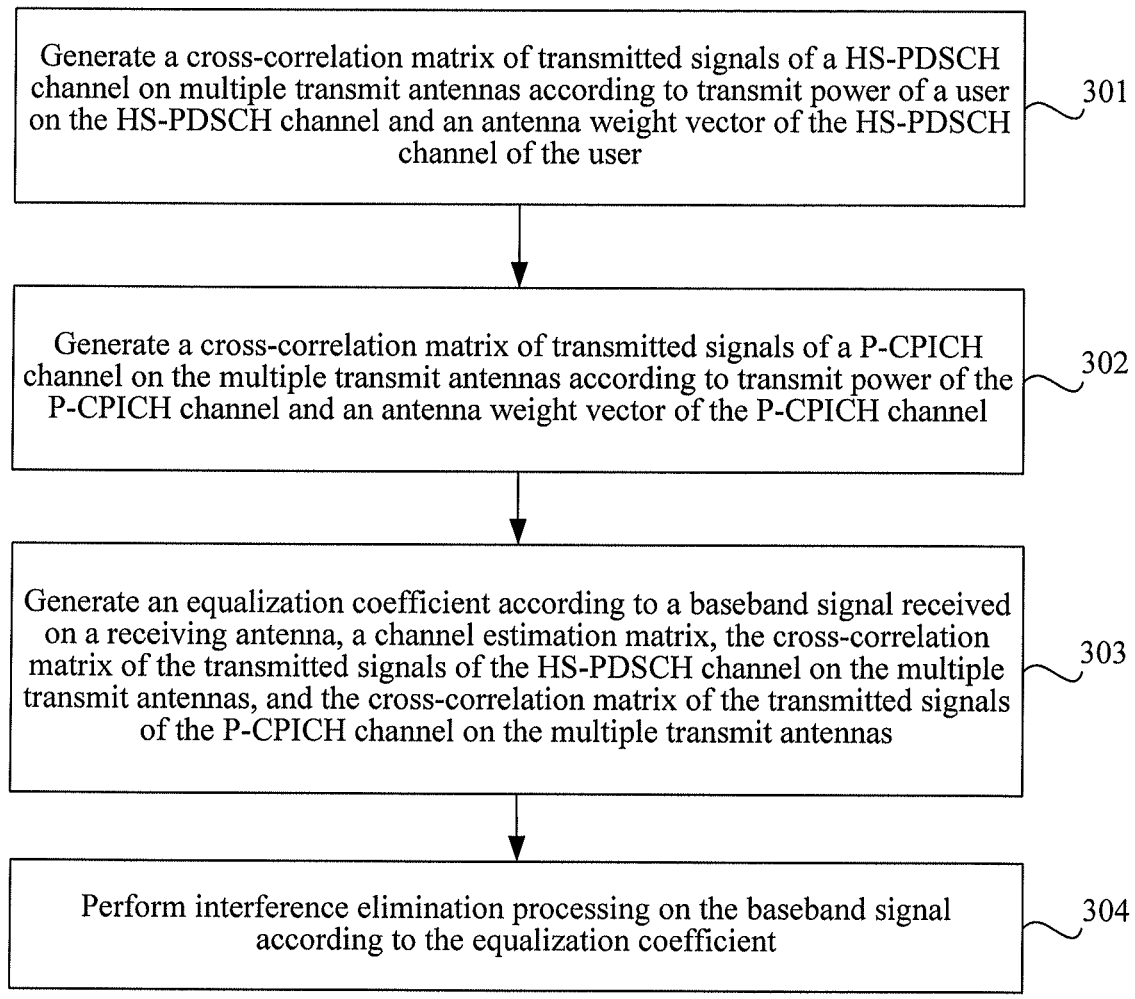
FIG. 3 is a flow chart of a third embodiment of an interference elimination method for a multi-antenna system according to the present invention.

FIG. 3 is a flow chart of a third embodiment of an interference elimination method for a multi-antenna system according to the present invention. As shown in FIG. 3, the embodiment provides an interference elimination method for a multi-antenna system. In this embodiment, in addition to cross-correlation of transmitted signals of an HS-PDSCH channel on multiple transmit antennas, cross-correlation of transmitted signals of other channels other than the HS-PDSCH channel on multiple transmit antennas is further considered. For the following several channels, no cross-correlation exists between transmitted signals on multiple transmit antennas, and accordingly contribution of the channels to a cross-correlation matrix is 0, and the channels are not considered: channels using Space-Time Transmit Diversity (abbreviated as STTD hereinafter) mode, such as a high speed shared control channel (High Speed Shared Control Channel; abbreviated as HS-SCCH hereinafter) and a hybrid automatic repeat request indicator channel (Hybrid Automatic Repeat Request Indicator Channel; abbreviated as HICH hereinafter); channels using time switched transmit diversity (Time Switched Transmit Diversity; abbreviated as TSTD hereinafter) mode, such as a primary synchronization channel (Primary Synchronization Channel; abbreviated as P-SCH hereinafter) and a supplemented synchronization channel (Supplemented Synchronization Channel; abbreviated as S-SCH hereinafter); and a P-CPICH and a supplemented common pilot channel (Supplemented Common Pilot Channel; abbreviated as S-CPICH hereinafter) channel in primary and supplemented pilot mode. Therefore, in this embodiment, other channels other than the HS-PDSCH channel refer to P-CPICH channels. The method provided in this embodiment may specifically include the following steps:

Step 301: Generate a cross-correlation matrix of transmitted signals of an HS-PDSCH channel on multiple transmit antennas according to transmit power of a user on the HS-PDSCH channel and an antenna weight vector of the HS-PDSCH channel of the user. This step may be similar to step 201, and is not further repeated herein again.

Step 302: Generate a cross-correlation matrix of transmitted signals of a P-CPICH channel on multiple transmit antennas according to transmit power of the P-CPICH channel and an antenna weight vector of the P-CPICH channel.

In this embodiment, in calculation of the cross-correlation matrix of the transmitted signals of the P-CPICH channel on the multiple transmit antennas, the cross-correlation matrix may be obtained through calculation by using the following Formula (7) according to the transmit power of the P-CPICH channel and the antenna weight vector of the P-CPICH channel:

$$R_{qq} = \left[ \frac{1}{2} \alpha_{qC} w^{(C)} w^{(C)H} + \begin{pmatrix} \alpha_{q1}^{(2)} & \cdots & 0 \\ 0 & \cdots & 0 \\ 0 & \cdots & \alpha_{qn}^{(2)} \end{pmatrix} \right] \otimes I \quad (7)$$

where, $\alpha_{qC}$ is the transmit power of the P-CPICH channel, $w^{(C)}=(1 \ldots A_n)$ is the antenna weight vector of the P-CPICH channel, $A_i$ (i=2, ..., n) is a pilot symbol of the P-CPICH channel modulated on an $i^{th}$ transmit antenna and may have a specific value of ±1, $$\begin{pmatrix} \alpha_{q1}^{(2)} & \cdots & 0 \\ 0 & \cdots & 0 \\ 0 & \cdots & \alpha_{qn}^{(2)} \end{pmatrix}$$

is a diagonal matrix, $\alpha_{qi}^{(2)}$ (i=1, 2, ..., n) is power of a channel other than the HS-PDSCH channel and the P-CPICH channel on multiple transmit antennas, and $$\sum_{p=1}^{U} \alpha_s^{(p)} + \alpha_{qC} + \sum_{q=1}^{n} \alpha_{qi}^{(2)} = E_c.$$

Step 303: Generate an equalization coefficient according to a baseband signal received on a receiving antenna, a channel estimation matrix, the cross-correlation matrix of the transmitted signals of the HS-PDSCH channel on the multiple transmit antennas, and the cross-correlation matrix of the transmitted signals of the P-CPICH channel on the multiple transmit antennas.

After the cross-correlation matrix $R_{qq}$ of the transmitted signals of the P-CPICH channel on the multiple transmit antennas is obtained, in this step, an equalization coefficient f is generated through calculation by using Formula (5) according to a baseband signal r received on the receiving antenna, a channel estimation matrix H, the cross-correlation matrix $R_{ss}$ of the transmitted signals of the HS-PDSCH channel on the multiple transmit antennas generated through calculation in step 301, and the cross-correlation matrix $R_{qq}$ of the transmitted signals of the P-CPICH channel on the multiple transmit antennas.

Step 304: Perform interference elimination processing on the baseband signal according to the equalization coefficient.

After the equalization coefficient f is obtained in the foregoing step, the interference elimination processing is performed on the baseband signal r, which is received by a receiver, according to the equalization coefficient, which is specifically as shown by Formula (6). After the received baseband signal is processed by an MMSE equalizer, an estimated value r' of the transmitted signal is obtained, then the interference generated due to the cross-correlation of the transmitted signals of the HS-PDSCH channel and the P-CPICH channel on the multiple transmit antennas is eliminated.

According to the interference elimination method for a multi-antenna system provided by the embodiment, in calculation of the equalization coefficient of the equalizer, the correlation between the transmitted signals of the HS-PDSCH channel and the P-CPICH channel on multiple transmit antennas is considered, the equalization coefficient is generated according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the P-CPICH channel on the multiple transmit antennas, and the interference elimination processing is performed on the baseband signal according to the equalization coefficient. In the embodiment, the interference generated due to the correlation between the transmitted signals of the HS-PDSCH channel and the P-CPICH channel on multiple transmit antennas is eliminated, the equalization effect is improved, and the performance of the receiver is improved.

Figure 4:
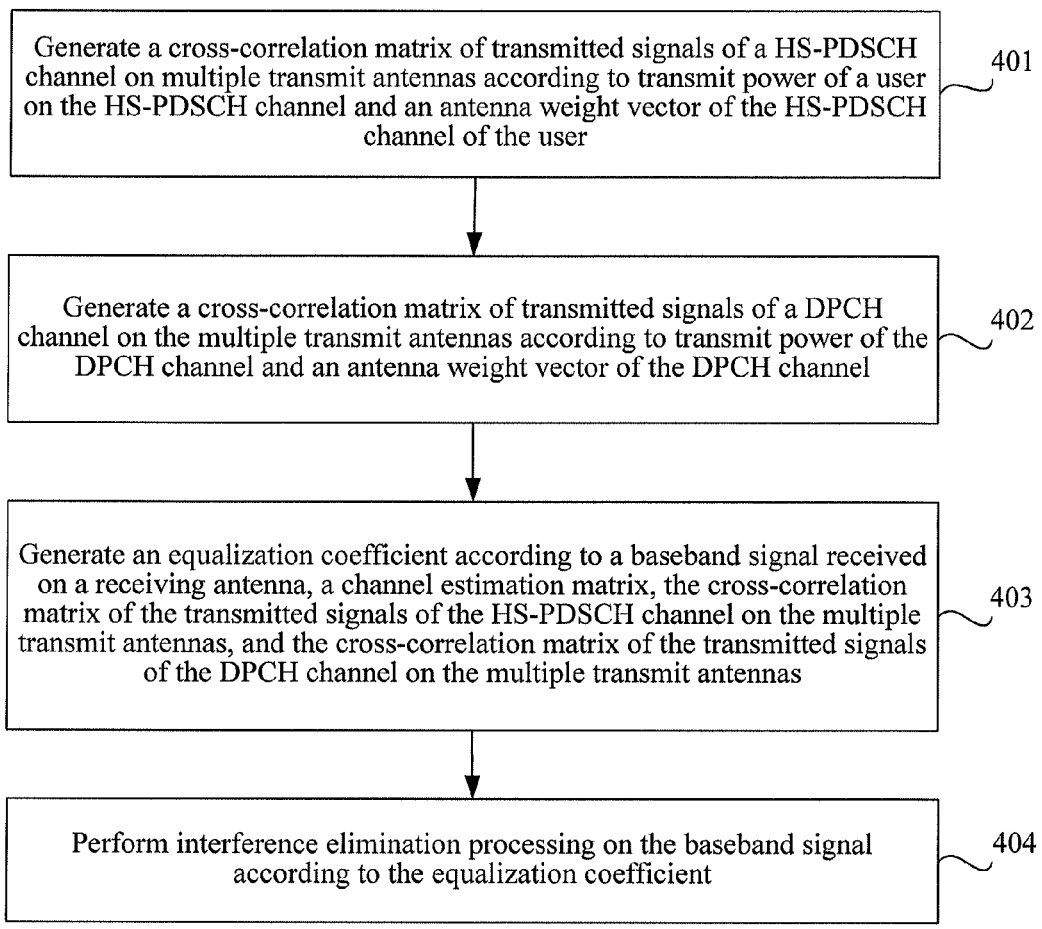
FIG. 4 is a flow chart of a fourth embodiment of an interference elimination method for a multi-antenna system according to the present invention.

FIG. 4 is a flow chart of a fourth embodiment of an interference elimination method for a multi-antenna system according to the present invention. As shown in FIG. 4, the embodiment provides an interference elimination method for a multi-antenna system. In this embodiment, in addition to cross-correlation of transmitted signals of an HS-PDSCH channel on multiple transmit antennas, cross-correlation of transmitted signals of other channel other than the HS-PDSCH channel on multiple transmit antennas is further considered. In this embodiment, other channel other than the HS-PDSCH channel refer to a DPCH channel using a CLD transmit diversity mode. The method provided in this embodiment may specifically include the following steps:

Step 401: Generate a cross-correlation matrix of transmitted signals of an HS-PDSCH channel on multiple transmit antennas according to transmit power of a user on the HS-PDSCH channel and an antenna weight vector of the HS-PDSCH channel of the user. The step may be similar to step 201, and is not further repeated herein again.

Step 402: Generate a cross-correlation matrix of transmitted signals of a DPCH channel on multiple transmit antennas according to transmit power of the DPCH channel and an antenna weight vector of the DPCH channel.

In this embodiment, in calculation of the cross-correlation matrix of the transmitted signals of the DPCH channel on the multiple transmit antennas, the cross-correlation matrix may be obtained through calculation by using the following Formula (8) according to the transmit power of the DPCH channel and the antenna weight vector of the DPCH channel:

$$R_{qq} = \left[ \alpha_{qD} w^{(D)} w^{(D)H} + \begin{pmatrix} \alpha_{q1}^{(3)} & \cdots & 0 \\ 0 & \cdots & 0 \\ 0 & \cdots & \alpha_{qn}^{(3)} \end{pmatrix} \right] \otimes I \quad (8)$$

where, $\alpha_{qD}$ is the transmit power of the DPCH channel, $$w^{(D)} = \begin{bmatrix} w_1^{(D)} \\ \cdots \\ w_n^{(D)} \end{bmatrix}$$

is the antenna weight vector of the DPCH channel, $$\begin{pmatrix} \alpha_{q1}^{(3)} & \cdots & 0 \\ 0 & \cdots & 0 \\ 0 & \cdots & \alpha_{qn}^{(3)} \end{pmatrix}$$

is a diagonal matrix, $\alpha_{qi}^{(3)}$ (i=1, 2, ..., n) is power of a channel other than the HS-PDSCH channel and the DPCH channel on multiple transmit antennas, and $$\sum_{p=1}^{U} \alpha_s^{(p)} + \alpha_{pD} + \sum_{q=1}^{n} \alpha_{qi}^{(3)} = E_c.$$

Step 403: Generate an equalization coefficient according to a baseband signal received on a receiving antenna, a channel estimation matrix, the cross-correlation matrix of the transmitted signals of the HS-PDSCH channel on the multiple transmit antennas, and the cross-correlation matrix of the transmitted signals of the DPCH channel on the multiple transmit antennas.

After the cross-correlation matrix $R_{qq}$ of the transmitted signals of the DPCH channel on the multiple transmit antennas is obtained, in this step, an equalization coefficient f is generated through calculation by using Formula (5) according to a baseband signal r received on the receiving antenna, a channel estimation matrix H, the cross-correlation matrix $R_{ss}$ of the transmitted signals of the HS-PDSCH channel on the multiple transmit antennas generated through calculation in step 401, and the cross-correlation matrix $R_{qq}$ of the transmitted signals of the DPCH channel on the multiple transmit antennas generated through calculation in step 402.

Step 404: Perform interference elimination processing on the baseband signal according to the equalization coefficient.

After the equalization coefficient f is obtained in the foregoing step, the interference elimination processing is performed on the baseband signal r, which is received by a receiver, according to the equalization coefficient, which is specifically as shown by Formula (6). After the received baseband signal is processed by an MMSE equalizer, an estimated value r' of the transmitted signal is obtained, then the interference generated due to the cross-correlation of the transmitted signals of the HS-PDSCH channel and the DPCH channel on the multiple transmit antennas is eliminated.

According to the interference elimination method for a multi-antenna system provided by the embodiment, in calculation of the equalization coefficient of the equalizer, the correlation between the transmitted signals of the HS-PDSCH channel and the DPCH channel on multiple transmit antennas is considered, the equalization coefficient is generated according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the DPCH channel on the multiple transmit antennas, and the interference elimination processing is performed on the baseband signal according to the equalization coefficient. In the embodiment, the interference generated due to the correlation between the transmitted signals of the HS-PDSCH channel and the DPCH channel on multiple transmit antennas is eliminated, the equalization effect is improved, and the performance of the receiver is improved.

Figure 5:
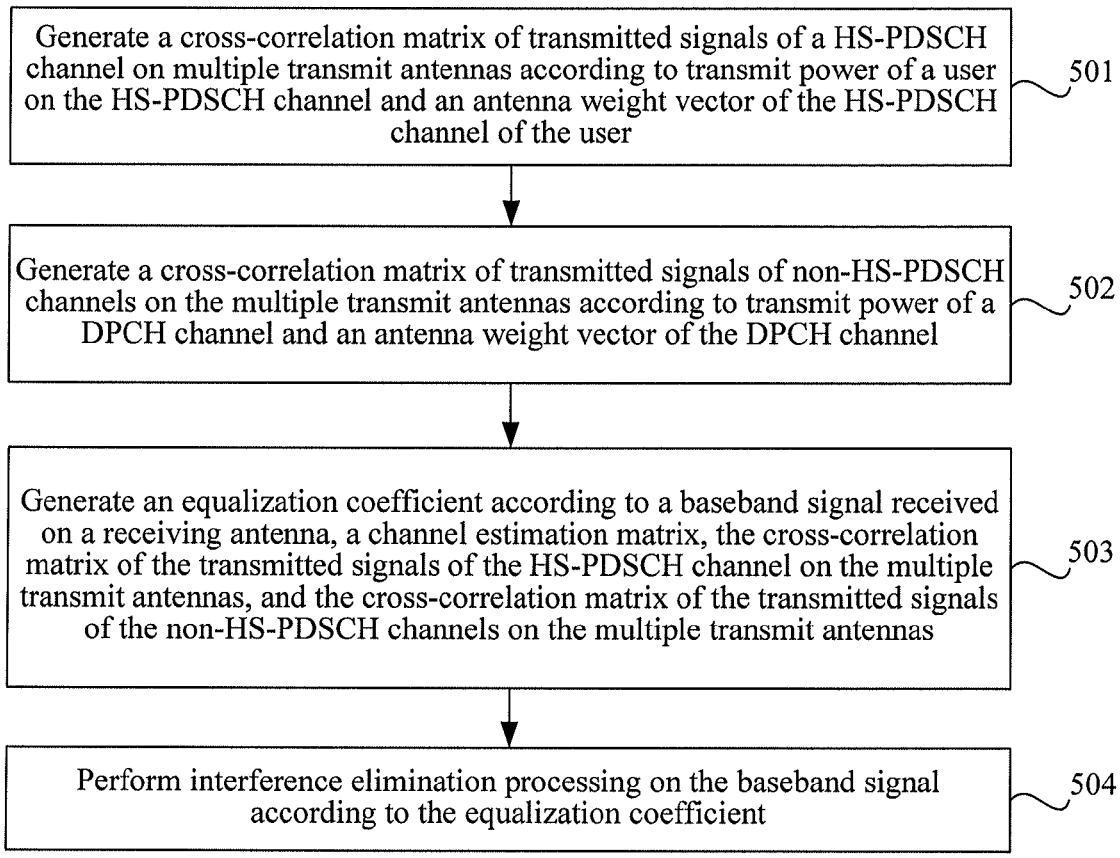
FIG. 5 is a flow chart of a fifth embodiment of an interference elimination method for a multi-antenna system according to the present invention.

FIG. 5 is a flow chart of a fourth embodiment of an interference elimination method for a multi-antenna system according to the present invention. As shown in FIG. 5, the embodiment provides an interference elimination method for a multi-antenna system. In this embodiment, in addition to cross-correlation of transmitted signals of an HS-PDSCH channel on multiple transmit antennas, cross-correlation of transmitted signals of other channels other than the HS-PDSCH channel on multiple transmit antennas is further considered. In this embodiment, other channels other than the HS-PDSCH channel refer to a P-CPICH channel and a DPCH channel that uses a CLD transmit diversity mode. The method provided in this embodiment may specifically include the following steps:

Step 501: Generate a cross-correlation matrix of transmitted signals of an HS-PDSCH channel on multiple transmit antennas according to transmit power of a user on the HS-PDSCH channel and an antenna weight vector of the HS-PDSCH channel of the user. The step may be similar to step 201, and is not further repeated herein again.

Step 502: Generate a cross-correlation matrix of transmitted signals of non-HS-PDSCH channel on multiple transmit antennas according to transmit power of a DPCH channel and an antenna weight vector of the DPCH channel.

In this embodiment, in calculation of the cross-correlation matrix of the transmitted signals of the P-CPICH channel and the DPCH channel on the multiple transmit antennas, the cross-correlation matrix may be obtained through calculation by using the following Formula (9) according to the transmit power of the P-CPICH channel, the antenna weight vector of the P-CPICH channel, the transmit power of the DPCH channel, and the antenna weight vector of the DPCH channel:

$$R_{qq} = \left[ \frac{1}{2} \alpha_{qC} w^{(C)} w^{(C)H} + \alpha_{qD} w^{(D)} w^{(D)H} + \begin{pmatrix} \alpha_{q1}^{(4)} & \cdots & 0 \\ & \cdots & \\ 0 & \cdots & \alpha_{qn}^{(4)} \end{pmatrix} \right] \otimes I \quad (9)$$

where $\alpha_{qC}$ is the transmit power of the P-CPICH channel, $w^{(C)} = (1 \ldots A_n)$ is the antenna weight vector of the P-CPICH channel, $A_i$ (i=2, ..., n) is a pilot symbol of the P-CPICH channel modulated on an $i^{th}$ transmit antenna, $\alpha_{qD}$ is the transmit power of the DPCH channel, $$w^{(D)} = \begin{bmatrix} w_1^{(D)} \\ \cdots \\ w_n^{(D)} \end{bmatrix}$$

is the antenna weight vector of the DPCH channel, $$\begin{pmatrix} \alpha_{q1}^{(4)} & \cdots & 0 \\ 0 & \cdots & 0 \\ 0 & \cdots & \alpha_{qn}^{(4)} \end{pmatrix}$$

is a diagonal matrix, $\alpha_{qi}^{(4)}$ (i=1, 2, ..., n) is power of a channel other than the HS-PDSCH channel, the P-CPICH channel and the DPCH channel on multiple transmit antennas, and $$\sum_{p=1}^{U} \alpha_s^{(p)} + \alpha_{qC} + \alpha_{qD} + \sum_{q=1}^{n} \alpha_{qi}^{(4)} = E_c.$$

Step 503: Generate an equalization coefficient according to a baseband signal received on a receiving antenna, a channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas.

After the cross-correlation matrix $R_{qq}$ of the transmitted signals of the P-CPICH channel and the DPCH channel on the multiple transmit antennas is obtained, in this step, an equalization coefficient f is generated through calculation by using Formula (5) according to a baseband signal r received on the receiving antenna, a channel estimation matrix H, the cross-correlation matrix $R_{ss}$ of the transmitted signals of the HS-PDSCH channel on the multiple transmit antennas generated through calculation in step 501, and the cross-correlation matrix $R_{qq}$ of the transmitted signals of the P-CPICH channel and the DPCH channel on the multiple transmit antennas generated in step 502.

Step 504: Perform interference elimination processing on the baseband signal according to the equalization coefficient.

After the equalization coefficient f is obtained in the foregoing step, the interference elimination processing is performed on the baseband signal r, which is received by a receiver, according to the equalization coefficient, which is specifically as shown by Formula (6). After the received baseband signal is processed by an MMSE equalizer, an estimated value r' of the transmitted signal is obtained, then the interference generated due to the cross-correlation of the transmitted signals of the HS-PDSCH channel, the P-CPICH channel and the DPCH channel on the multiple transmit antennas is eliminated.

According to the interference elimination method for a multi-antenna system provided by the embodiment, in calculation of the equalization coefficient of the equalizer, the correlation between the transmitted signals of the HS-PDSCH channel, the P-CPICH channel, and the DPCH channel on multiple transmit antennas is considered, the equalization coefficient is generated according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the P-CPICH channel and the DPCH channel on the multiple transmit antennas, and the interference elimination processing is performed on the baseband signal according to the equalization coefficient. In the embodiment, the interference generated due to the correlation between the transmitted signals of the HS-PDSCH channel, the P-CPICH channel, and the DPCH channel on multiple transmit antennas is eliminated, the equalization effect is improved, and the performance of the receiver is improved.

Those of ordinary skill in the art should understand that all or a part of the steps of the method according to the embodiments may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk or an optical disk.

Figure 6:
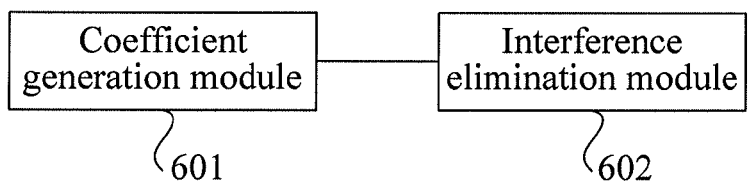
FIG. 6 is a structural diagram of a first embodiment of an interference elimination apparatus for a multi-antenna system according to the present invention.

FIG. 6 is a structural diagram of a first embodiment of an interference elimination apparatus for a multi-antenna system according to the present invention. As shown in FIG. 6, the embodiment provides an interference elimination apparatus for a multi-antenna system. In this embodiment, each step in the method embodiment 1 may be specifically performed, and details are not further repeated herein again. The interference elimination apparatus for a multi-antenna system provided in the embodiment may specifically include a coefficient generation module 601 and an interference elimination module 602. The coefficient generation module 601 is configured to generate an equalization coefficient according to a baseband signal received on a receiving antenna, a channel estimation matrix, and an obtained cross-correlation matrix of transmitted signals of a downlink channel on multiple transmit antennas. The interference elimination module 602 is configured to perform interference elimination processing on the baseband signal according to the equalization coefficient.

Figure 7:
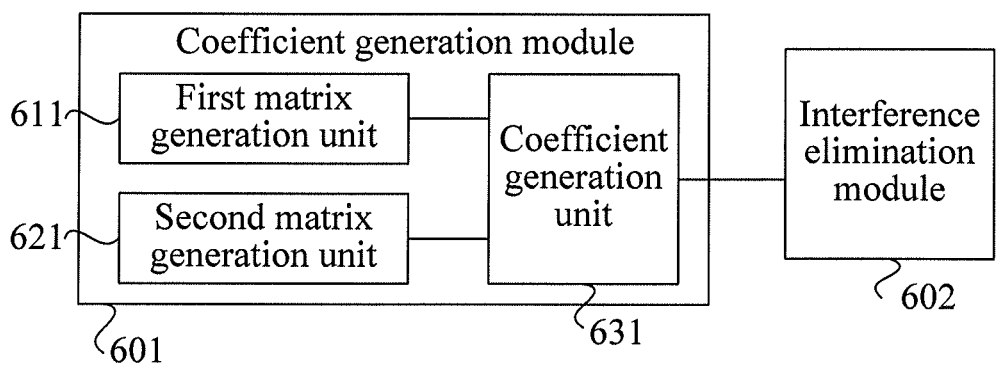
FIG. 7 is a structural diagram of a second embodiment of an interference elimination method for a multi-antenna system according to the present invention.

FIG. 7 is a structural diagram of a second embodiment of an interference elimination apparatus for a multi-antenna system according to the present invention. As shown in FIG. 7, the embodiment provides an interference elimination apparatus for a multi-antenna system. In the embodiment, each step in the method embodiment 1 to embodiment 5 may be specifically performed, and details are not further repeated herein again. For the interference elimination apparatus for a multi-antenna system provided in the embodiment, on the basis of the structure shown in FIG. 6, the coefficient generation module 601 in the embodiment may specifically include a first matrix generation unit 611, a second matrix generation unit 621, and a coefficient generation unit 631. The first matrix generation unit 611 is configured to generate a cross-correlation matrix of transmitted signals of an HS-PDSCH channel on multiple transmit antennas according to transmit power and an antenna weight vector on the HS-PDSCH channel.

The second matrix generation unit 621 is configured to generate a cross-correlation matrix of transmitted signals of a non-HS-PDSCH channel on multiple transmit antennas according to transmit power and an antenna weight vector on the non-HS-PDSCH channel. The coefficient generation unit 631 is configured to generate the equalization coefficient according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas. Specifically, the coefficient generation unit 631 in the embodiment may generate the equalization coefficient specifically by using Formula (5).

Specifically, the first matrix generation unit 611 in this embodiment may be specifically configured to generate the cross-correlation matrix of the transmitted signals of the HS-PDSCH channel on the multiple transmit antennas by using Formula (1) according to transmit power of a current user on the HS-PDSCH channel and an antenna weight vector of the HS-PDSCH channel of the current user.

Alternatively, the first matrix generation unit 611 in this embodiment may be further specifically configured to generate the cross-correlation matrix of the transmitted signals of the HS-PDSCH channel on the multiple transmit antennas by using Formula (2) according to the transmit power of the current user on the HS-PDSCH channel, the antenna weight vector of the HS-PDSCH channel of the current user, transmit power of each non-current user, and an antenna weight vector of an HS-PDSCH channel of each non-current user.

In addition, the second matrix generation unit 621 in this embodiment may be specifically configured to generate the cross-correlation matrix of the transmitted signals of the non-HS-PDSCH channel on the multiple transmit antennas by using Formula (3).

Alternatively, the second matrix generation unit 621 in this embodiment may be specifically configured to generate a cross-correlation matrix of transmitted signals of a P-CPICH channel on multiple transmit antennas by using Formula (7) according to transmit power of the P-CPICH channel and an antenna weight vector of the P-CPICH channel. In this case, the coefficient generation unit 631 is specifically configured to generate an equalization coefficient by using Formula (5) according to the baseband signal received on the receiving antenna, the channel estimation matrix, the cross-correlation matrix of the transmitted signals of the HS-PDSCH channel on the multiple transmit antennas and the cross-correlation matrix of the transmitted signals of the P-CPICH channel on the multiple transmit antennas.

Alternatively, the second matrix generation unit 621 in this embodiment may be specifically configured to generate a cross-correlation matrix of transmitted signals of a DPCH channel on multiple transmit antennas by using Formula (8) according to transmit power of the DPCH channel and an antenna weight vector of the DPCH channel. In this case, the coefficient generation unit 631 is specifically configured to generate an equalization coefficient by using Formula (5) according to the baseband signal received on the receiving antenna, the channel estimation matrix, the cross-correlation matrix of the transmitted signals of the HS-PDSCH channel on the multiple transmit antennas and the cross-correlation matrix of the transmitted signals of the DPCH channel on the multiple transmit antennas.

Alternatively, the second matrix generation unit 621 in this embodiment may be specifically configured to generate a cross-correlation matrix of transmitted signals of non-HS-PDSCH channel on multiple transmit antennas by using Formula (9) according to the transmit power of the P-CPICH channel, the antenna weight vector of the P-CPICH channel, the transmit power of the DPCH channel, and the antenna weight vector of the DPCH channel. In this case, the coefficient generation unit 631 is specifically configured to generate an equalization coefficient by using Formula (5) according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas.

This embodiment provides an interference elimination apparatus for a multi-antenna system. In calculation of the equalization coefficient of an equalizer, correlation between the transmitted signals of the downlink channel on multiple transmit antennas is considered, the equalization coefficient is generated according to the baseband signal received on the receiving antenna, the channel estimation matrix, and the obtained cross-correlation matrix of the transmitted signals of the downlink channel on the multiple transmit antennas, and the interference elimination processing is performed on the baseband signal according to the equalization coefficient. In the embodiment, the interference generated due to the correlation between the transmitted signals of the downlink channel on the multiple transmit antennas is eliminated, the equalization effect is improved, and the performance of a receiver is improved.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not make the essence of the corresponding technical solutions depart from the spirit and the scope of the technical solutions according to the embodiments of the present invention.

What is claimed is:

1. An interference elimination method for a multi-antenna system, comprising:
   generating an equalization coefficient according to a baseband signal received on a receiving antenna, a channel estimation matrix, and an obtained cross-correlation matrix of transmitted signals of a downlink channel on multiple transmit antennas; and
   performing interference elimination processing on the baseband signal according to the equalization coefficient.

2. The method according to claim 1, wherein the generating the equalization coefficient according to the baseband signal received on the receiving antenna, the channel estimation matrix, and the obtained cross-correlation matrix of the transmitted signals of the downlink channel on the multiple transmit antennas comprises:
   generating a cross-correlation matrix of transmitted signals of a high speed-physical downlink shared channel HS-PDSCH channel on the multiple transmit antennas according to transmit power and an antenna weight vector on the HS-PDSCH channel;
   generating a cross-correlation matrix of transmitted signals of a non-HS-PDSCH channel on the multiple transmit antennas according to transmit power and an antenna weight vector on the non-HS-PDSCH channel; and generating the equalization coefficient according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas.

3. The method according to claim 2, wherein the generating the equalization coefficient according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas is:

generating the equalization coefficient by using the following formula:

$$f = \{HR_{ss}H^H + HR_{qq}H^H + R_{vv}\}^{-1}He_d$$

wherein, H is the channel estimation matrix, $R_{ss}$ is the cross-correlation matrix of the transmitted signals of the HS-PDSCH channel on the multiple transmit antennas, $R_{qq}$ is the cross-correlation matrix of the transmitted signals of the non-HS-PDSCH channel on the multiple transmit antennas, $R_{vv}$ is a cross-correlation matrix of noise, and $e_d$ represents an element of a column d in the matrix.

4. The method according to claim 2, wherein the generating the cross-correlation matrix of the transmitted signals of the high speed-physical downlink shared channel HS-PDSCH channel on the multiple transmit antennas according to the transmit power and the antenna weight vector on the HS-PDSCH channel comprises:

generating the cross-correlation matrix of the transmitted signals of the HS-PDSCH channel on the multiple transmit antennas by using the following formula:

$$R_{ss} = (\alpha_s^{(1)} w^{(1)} w^{(1)H}) \otimes I$$

wherein, $\otimes$ represents direct product, $\alpha_s^{(1)}$ is the transmit power of the current user on the HS-PDSCH channel, $$w^{(1)} = \begin{bmatrix} w_1^{(1)} \\ \ldots \\ w_n^{(1)} \end{bmatrix}$$

is the antenna weight vector of the HS-PDSCH channel of the current user, I is a unit matrix, and n is the number of the transmit antennas.

5. The method according to claim 2, wherein the generating the cross-correlation matrix of the transmitted signals of the high speed-physical downlink shared channel HS-PDSCH channel on the multiple transmit antennas according to the transmit power and the antenna weight vector on the HS-PDSCH channel comprises:

generating the cross-correlation matrix of the transmitted signals of the HS-PDSCH channel on the multiple transmit antennas by using the following formula:

$$R_{ss} = \left( \alpha_s^{(1)} w^{(1)} w^{(1)H} + \sum_{p=2}^{U} \alpha_s^{(p)} w^{(p)} w^{(p)H} \right) \otimes I$$

wherein, $\otimes$ represents direct product, $\alpha_s^{(1)}$ is the transmit power of the current user on the HS-PDSCH channel, $$w^{(1)} = \begin{bmatrix} w_1^{(1)} \\ \ldots \\ w_n^{(1)} \end{bmatrix}$$

is the antenna weight vector of the HS-PDSCH channel of the current user, I is a unit matrix, n is the number of the transmit antennas, $p \in (2, 3, \ldots, U)$, U−1 is the number of non-current users, $\alpha_s^{(p)}$ is the transmit power of the non-current user, and $$w^{(p)} = \begin{bmatrix} w_1^{(p)} \\ \ldots \\ w_n^{(p)} \end{bmatrix}$$

is the antenna weight vector of the HS-PDSCH channel of the non-current user.

6. The method according to claim 3, wherein the generating the cross-correlation matrix of the transmitted signals of the non-HS-PDSCH channel on the multiple transmit antennas according to the transmit power and the antenna weight vector on the non-HS-PDSCH channel, comprises:

generating the cross-correlation matrix of the transmitted signals of the non-HS-PDSCH channel on the multiple transmit antennas by using the following formula:

$$R_{qq} = \begin{pmatrix} \alpha_{q1}^{(1)} & \ldots & 0 \\ 0 & \ldots & 0 \\ 0 & \ldots & \alpha_{qn}^{(1)} \end{pmatrix},$$

wherein, $R_{qq}$ is a diagonal matrix, $\alpha_{qi}^{(1)}$ (i=1, 2, \ldots, n) is the power of the non-HS-PDSCH channel on the multiple transmit antennas, and $$\sum_{q=1}^{n} \alpha_{qi}^{(1)} = E_c,$$

wherein $E_c$ is chip power; and the antenna weight vector is 0.

7. The method according to claim 3, wherein the generating the cross-correlation matrix of the transmitted signals of the non-HS-PDSCH channel on the multiple transmit antennas according to the transmit power and the antenna weight vector on the non-HS-PDSCH channel, comprises:

generating a cross-correlation matrix of transmitted signals of a primary common pilot channel P-CPICH channel on the multiple transmit antennas by using the following formula:

$$R_{qq} = \left[\frac{1}{2}\alpha_{qC}w^{(C)}w^{(C)H} + \begin{pmatrix} \alpha_{q1}^{(2)} & \cdots & 0 \\ 0 & \cdots & 0 \\ 0 & \cdots & \alpha_{qn}^{(2)} \end{pmatrix}\right] \otimes I,$$

wherein, $\alpha_{qC}$ is the transmit power of the P-CPICH channel, $w^{(C)} = (1 \ldots A_n)$ is the antenna weight vector of the P-CPICH channel, $A_i$ (i 2, ..., n) is a pilot symbol of the P-CPICH channel modulated in an $i^{th}$ transmit antenna, $$\begin{pmatrix} \alpha_{q1}^{(2)} & \cdots & 0 \\ 0 & \cdots & 0 \\ 0 & \cdots & \alpha_{qn}^{(2)} \end{pmatrix}$$

is a diagonal matrix, $\alpha_{qi}^{(2)}$ (i=1, 2, ..., n) is power of a channel other than the HS-PDSCH channel and the P-CPICH channel on multiple transmit antennas, and $$\sum_{p=1}^{U} \alpha_s^{(p)} + \alpha_{qC} + \sum_{q=1}^{n} \alpha_{qi}^{(2)} = E_c.$$

8. The method according to claim 3, wherein the generating the cross-correlation matrix of the transmitted signals of the non-HS-PDSCH channel on the multiple transmit antennas according to the transmit power and the antenna weight vector on the non-HS-PDSCH channel comprises:

generating a cross-correlation matrix of transmitted signals of a dedicated physical channel DPCH channel on the multiple transmit antennas by using the following formula:

$$R_{qq} = \left[\alpha_{qD}w^{(D)}w^{(D)H} + \begin{pmatrix} \alpha_{q1}^{(3)} & \cdots & 0 \\ 0 & \cdots & 0 \\ 0 & \cdots & \alpha_{qn}^{(3)} \end{pmatrix}\right] \otimes I$$

wherein, $\alpha_{qD}$ is the transmit power of the DPCH channel, $$w^{(D)} = \begin{bmatrix} w_1^{(D)} \\ \cdots \\ w_n^{(D)} \end{bmatrix}$$

is the antenna weight vector of the DPCH channel, $$\begin{pmatrix} \alpha_{q1}^{(3)} & \cdots & 0 \\ 0 & \cdots & 0 \\ 0 & \cdots & \alpha_{qn}^{(3)} \end{pmatrix}$$

is a diagonal matrix, $\alpha_{qi}^{(3)}$ (i=1, 2, ..., n) is power of a channel other than the HS-PDSCH channel and the DPCH channel on multiple transmit antennas, and $$\sum_{p=1}^{U} \alpha_s^{(p)} + \alpha_{qD} + \sum_{q=1}^{n} \alpha_{qi}^{(3)} = E_c.$$

9. The method according to claim 3, wherein the generating the cross-correlation matrix of the transmitted signals of the non-HS-PDSCH channel on the multiple transmit antennas according to the transmit power and the antenna weight vector on the non-HS-PDSCH channel comprises:

generating a cross-correlation matrix of transmitted signals of non-HS-PDSCH channel on the multiple transmit antennas by using the following formula:

$$R_{qq} = \left[\frac{1}{2}\alpha_{qC}w^{(C)}w^{(C)H} + \alpha_{qD}w^{(D)}w^{(D)H} + \begin{pmatrix} \alpha_{q1}^{(4)} & \cdots & 0 \\ 0 & \cdots & 0 \\ 0 & \cdots & \alpha_{qn}^{(4)} \end{pmatrix}\right] \otimes I,$$

wherein $\alpha_{qC}$ is the transmit power of the P-CPICH channel, $w^{(C)} = (1 \ldots A_n)$ is the antenna weight vector of the P-CPICH channel $A_i$ (i=2, ..., n) is a pilot symbol of the P-CPICH channel on an $i^{th}$ transmit antenna, $\alpha_{qD}$ is the transmit power of the DPCH channel, $$w^{(D)} = \begin{bmatrix} w_1^{(D)} \\ \cdots \\ w_n^{(D)} \end{bmatrix}$$

is the antenna weight vector of the DPCH channel, $$\begin{pmatrix} \alpha_{q1}^{(4)} & \cdots & 0 \\ 0 & \cdots & 0 \\ 0 & \cdots & \alpha_{qn}^{(4)} \end{pmatrix}$$

is a diagonal matrix, $\alpha_{qi}^{(4)}$ (i=1, 2, ..., n) is power of a channel other than the HS-PDSCH channel, the P-CPICH channel and the DPCH channel on multiple transmit antennas, and $$\sum_{p=1}^{U} \alpha_s^{(p)} + \alpha_{qC} + \alpha_{qD} + \sum_{q=1}^{n} \alpha_{qi}^{(4)} = E_c.$$

10. A device for eliminating interference in a multi-antenna system, comprising a non-transitory computer readable storage medium and a processor, the non-transitory computer readable storage medium comprises a plurality of modules and units as codes executable by the processor, wherein the plurality of modules and units comprises:

a coefficient generation module, that generates an equalization coefficient according to a baseband signal received on a receiving antenna, a channel estimation matrix, and an obtained cross-correlation matrix of transmitted signals of a downlink channel on multiple transmit antennas; and an interference elimination module, that performs interference elimination processing on the baseband signal according to the equalization coefficient.

11. The device according to claim 10, wherein the coefficient generation module comprises:

a first matrix generation unit, that generates a cross-correlation matrix of transmitted signals of an HS-PDSCH channel on the multiple transmit antennas according to transmit power and an antenna weight vector on the HS-PDSCH channel;

a second matrix generation unit, that generates a cross-correlation matrix of transmitted signals of a non-HS-PDSCH channel on the multiple transmit antennas according to transmit power and an antenna weight vector on the non-HS-PDSCH channel; and a coefficient generation unit, that generates the equalization coefficient according to the baseband signal received on the receiving antenna, the channel estimation matrix, the cross-correlation matrix of the transmitted signals of the HS-PDSCH channel on the multiple transmit antennas, and the cross-correlation matrix of the transmitted signals of the non-HS-PDSCH channel on the multiple transmit antennas.

12. The device according to claim 11, wherein the coefficient generation unit generates the equalization coefficient by using the following formula:

$$f = \{HR_{ss}H^H + HR_{qq}H^H + R_{vv}\}^{-1}He_d,$$

wherein, H is the channel estimation matrix, $R_{ss}$ is the cross-correlation matrix of the transmitted signals of the HS-PDSCH channel on the multiple transmit antennas, $R_{qq}$ is the cross-correlation matrix of the transmitted signals of the non-HS-PDSCH channel on the multiple transmit antennas, $R_{vv}$ is a cross-correlation matrix of noise, and $e_d$ represents an element of a column d in the matrix.

13. The device according to claim 12, wherein the first matrix generation unit generates the cross-correlation matrix of the transmitted signals of the HS-PDSCH channel on the multiple transmit antennas by using the following formula:

$$R_{ss} = (\alpha_s^{(1)} w^{(1)} w^{(1)H}) \otimes I,$$

wherein, $\otimes$ represents direct product, $\alpha_s^{(1)}$ is the transmit power of the current user on the HS-PDSCH channel, $$w^{(1)} = \begin{bmatrix} w_1^{(1)} \\ \ldots \\ w_n^{(1)} \end{bmatrix}$$

is the antenna weight vector of the HS-PDSCH channel of the current user, I is a unit matrix, and n is the number of the transmit antennas.

14. The device according to claim 12, wherein the first matrix generation unit generates the cross-correlation matrix of the transmitted signals of the HS-PDSCH channel on the multiple transmit antennas by using the following formula:

$$R_{ss} = \left( \alpha_s^{(1)} w^{(1)} w^{(1)H} + \sum_{p=2}^{U} \alpha_s^{(p)} w^{(p)} w^{(p)H} \right) \otimes I,$$

wherein, $\otimes$ represents direct product, $\alpha_s^{(1)}$ is the transmit power of the current user on the HS-PDSCH channel, $$w^{(1)} = \begin{bmatrix} w_1^{(1)} \\ \ldots \\ w_n^{(1)} \end{bmatrix}$$

is the antenna weight vector of the HS-PDSCH channel of the current user, I is a unit matrix, n is the number of the transmit antennas, $p \in (2, 3, \ldots, U)$, U−1 is the number of non-current users, $\alpha_s^{(p)}$ is the transmit power of the non-current user, and $$w^{(p)} = \begin{bmatrix} w_1^{(p)} \\ \ldots \\ w_n^{(p)} \end{bmatrix}$$

is the antenna weight vector of the HS-PDSCH channel of the non-current user.

15. The device according to claim 12, wherein the second matrix generation unit generates the cross-correlation matrix of the transmitted signals of the non-HS-PDSCH channel on the multiple transmit antennas by using the following formula (3):

$$R_{qq} = \begin{pmatrix} \alpha_{q1}^{(1)} & \ldots & 0 \\ 0 & \ldots & 0 \\ 0 & \ldots & \alpha_{qn}^{(1)} \end{pmatrix},$$

wherein, $R_{qq}$ is a diagonal matrix, $\alpha_{qi}^{(1)}$ (i=1, 2, . . . , n) is the power of the non-HS-PDSCH channel on the multiple transmit antennas, and $$\sum_{q=1}^{n} \alpha_{qi}^{(1)} = E_c,$$

wherein $E_c$ is chip power; and the antenna weight vector is 0.

16. The apparatus device according to claim 12, wherein the second matrix generation unit generates a cross-correlation matrix of transmitted signals of a primary common pilot channel P-CPICH channel on the multiple transmit antennas by using the following formula:

$$R_{qq} = \left[ \frac{1}{2} \alpha_{qC} w^{(C)} w^{(C)H} + \begin{pmatrix} \alpha_{q1}^{(2)} & \ldots & 0 \\ 0 & \ldots & 0 \\ 0 & \ldots & \alpha_{qn}^{(2)} \end{pmatrix} \right] \otimes I,$$

wherein, $\alpha_{qC}$ is the transmit power of the P-CPICH channel, $w^{(C)} = (1 \ldots A_n)$ is the antenna weight vector of the P-CPICH channel, $A_i$ (i=2, . . . , n) is a pilot symbol of the P-CPICH channel modulated in an transmit antenna, $$\begin{pmatrix} \alpha_{q1}^{(2)} & \ldots & 0 \\ 0 & \ldots & 0 \\ 0 & \ldots & \alpha_{qn}^{(2)} \end{pmatrix}$$

is a diagonal matrix, $\alpha_{qi}^{(2)}$ (i=1, 2, ..., n) is power of a channel other than the HS-PDSCH channel and the P-CPICH channel on multiple transmit antennas, and $$\sum_{p=1}^{U} \alpha_s^{(p)} + \alpha_{qC} + \sum_{q=1}^{n} \alpha_{qi}^{(2)} = E_c.$$

17. The device according to claim 12, wherein the second matrix generation unit generates a cross-correlation matrix of transmitted signals of a dedicated physical channel DPCH channel on the multiple transmit antennas by using the following formula:

$$R_{qq} = \left[\alpha_{qD} w^{(D)} w^{(D)H} + \begin{pmatrix} \alpha_{q1}^{(3)} & \cdots & 0 \\ 0 & \cdots & 0 \\ 0 & \cdots & \alpha_{qn}^{(3)} \end{pmatrix}\right] \otimes I,$$

wherein, $\alpha_{qD}$ is the transmit power of the DPCH channel, $$w^{(D)} = \begin{bmatrix} w_1^{(D)} \\ \cdots \\ w_n^{(D)} \end{bmatrix}$$

is the antenna weight vector of the DPCH channel, $$\begin{pmatrix} \alpha_{q1}^{(3)} & \cdots & 0 \\ 0 & \cdots & 0 \\ 0 & \cdots & \alpha_{qn}^{(3)} \end{pmatrix}$$

is a diagonal matrix, $\alpha_{qi}^{(3)}$ (i=1, 2, ..., n) is power of a channel other than the HS-PDSCH channel and the DPCH channel on multiple transmit antennas, and $$\sum_{p=1}^{U} \alpha_s^{(p)} + \alpha_{qD} + \sum_{q=1}^{n} \alpha_{qi}^{(3)} = E_c.$$

18. The device according to claim 12, wherein the second matrix generation unit generates a cross-correlation matrix of transmitted signals of non-HS-PDSCH channels on the multiple transmit antennas by using the following formula:

$$R_{qq} = \left[\frac{1}{2}\alpha_{qC} w^{(C)} w^{(C)H} + \alpha_{qD} w^{(D)} w^{(D)H} + \begin{pmatrix} \alpha_{q1}^{(4)} & \cdots & 0 \\ 0 & \cdots & 0 \\ 0 & \cdots & \alpha_{qn}^{(4)} \end{pmatrix}\right] \otimes I,$$

wherein $\alpha_{qC}$ is the transmit power of the P-CPICH channel, $w^{(C)} = (1 \ldots A_n)$ is the antenna weight vector of the P-CPICH channel, $A_i$ (i=2, ..., n) is a pilot symbol of the P-CPICH channel on an $i^{th}$ transmit antenna, $$\begin{pmatrix} \alpha_{q1}^{(4)} & \cdots & 0 \\ 0 & \cdots & 0 \\ 0 & \cdots & \alpha_{qn}^{(4)} \end{pmatrix}$$

is a diagonal matrix, $$w^{(D)} = \begin{bmatrix} w_1^{(D)} \\ \cdots \\ w_n^{(D)} \end{bmatrix}$$

is the antenna weight vector of the DPCH channel, $$\begin{pmatrix} \alpha_{q1}^{(4)} & \cdots & 0 \\ 0 & \cdots & 0 \\ 0 & \cdots & \alpha_{qn}^{(4)} \end{pmatrix}$$

is a diagonal matrix, $\alpha_{qi}^{(4)}$ (i=1, 2, ..., n) is power of a channel other than the HS-PDSCH channel, the P-CPICH channel and the DPCH channel on multiple transmit antennas, and $$\sum_{p=1}^{U} \alpha_s^{(p)} + \alpha_{qC} + \alpha_{qD} + \sum_{q=1}^{n} \alpha_{qi}^{(4)} = E_c.$$

\* \* \* \* \*